United States Patent
Wong et al.

(10) Patent No.: US 8,606,029 B1
(45) Date of Patent: Dec. 10, 2013

(54) HYBRIDIZED IMAGE ENCODING BASED ON REGION VOLATILITY

(75) Inventors: Albert Wong, Seattle, WA (US); Hin Chung Lam, Seattle, WA (US); Sergey Ulanov, Bellevue, WA (US); Gary Kacmarcik, Bothell, WA (US)

(73) Assignee: Google Inc., Mountain View, CA (US)

( * ) Notice: Subject to any disclaimer, the term of this patent is extended or adjusted under 35 U.S.C. 154(b) by 122 days.

(21) Appl. No.: 13/208,809

(22) Filed: Aug. 12, 2011

(51) Int. Cl.
*G06K 9/36* (2006.01)
*G06K 9/46* (2006.01)

(52) U.S. Cl.
USPC .......................................................... 382/239

(58) Field of Classification Search
USPC ............ 382/164, 173, 232, 233, 239; 375/240.02, 240.1, 240.16, 240.27, 375/240.29, 262, 341, E7.134, E7.148, 375/E7.173
See application file for complete search history.

(56) References Cited

U.S. PATENT DOCUMENTS

| | | | |
|---|---|---|---|
| 4,745,473 A | 5/1988 | Hall | |
| 7,016,409 B2 * | 3/2006 | Unger | 375/240.02 |
| 7,317,837 B2 * | 1/2008 | Yatabe et al. | 382/232 |
| 7,809,061 B1 * | 10/2010 | Sarna | 375/240.16 |
| 2004/0057521 A1 | 3/2004 | Brown et al. | |
| 2007/0217506 A1 | 9/2007 | Yang | |
| 2008/0232466 A1 | 9/2008 | Faerber et al. | |
| 2009/0304303 A1 | 12/2009 | Sykes | |
| 2010/0067598 A1 * | 3/2010 | Sampath et al. | 375/262 |

OTHER PUBLICATIONS

MPEG Encoding Basics, Snell & Wilcox, (2002), 7 pages.

* cited by examiner

*Primary Examiner* — Amir Alavi
(74) *Attorney, Agent, or Firm* — Brake Hughes Bellermann LLP

(57) ABSTRACT

In a general aspect, a computer-readable storage medium can be configured to store instructions that when executed cause a processor of a host device to perform a process. The instructions can include instructions to determine that a first region of a current image is identical to a first region of a prior image, and instructions to determine that a second region of the current image is different from a second region of the prior image. The instructions can also include instructions to calculate, in response to the determination that the second region of the current image is different, a rate of change associated with the portion of the second region, and instructions to identify a portion of the second region of the current image for encoding based on the rate of change associated with the portion of the second region of the current image based on a threshold value.

21 Claims, 12 Drawing Sheets

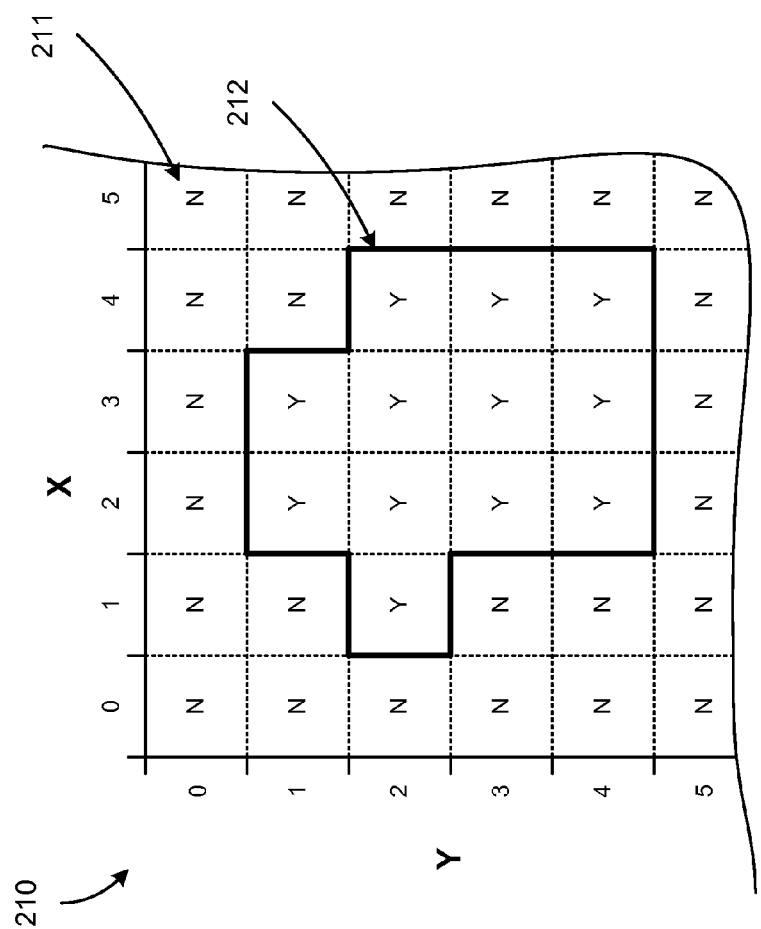

HYBRIDIZED IMAGE ENCODING BASED ON REGION VOLATILITY

TECHNICAL FIELD

This description relates to hybridized encoding of images.

BACKGROUND

A client device can be used to interact with an application operating at a host device via a remote desktop session. The host device can be configured to define a stream of screen images representing the interactions of the client device with the application, and can send the stream of screen images to the client device as the interactions are occurring via the remote desktop session. Although the host device can be configured to encode (e.g., compress) the screen images before sending the screen images to the client device where they are displayed, the compressed screen images can consume significant bandwidth over a connection between the client device and the host device. If the screen image updates consume too much bandwidth of the connection, interactions between the client device and the host device during a remote desktop session can be, for example, disrupted. Also, consumption of bandwidth for updates of the screen images at the client device can reduce the available bandwidth, which can already be limited, for other functions. Thus, a need exists for systems, methods, and apparatus to address the shortfalls of present technology and to provide other new and innovative features.

SUMMARY

In at least one general aspect, a computer-readable storage medium can be configured to store instructions that when executed cause a processor to perform a process. The instructions can include instructions to receive a block at a block location within an image from a plurality of images. The block location can be included in each image from a plurality of images defining at least a portion of a stream of images transmitted from a host device to a client device. The instructions can include instruction to calculate a rate of change of portions of the plurality of images at the block location being calculated based on more than two images from the plurality of images, and instructions to designate the block of the image for encoding based on a first encoder when a first condition is satisfied based on the rate of change. The instructions can include instructions to designate the block of the image for encoding based on a second encoder when a second condition is satisfied based on the rate of change.

In another general aspect an apparatus can include a rate calculator configured to decrement a rate value associated with a block location in response to a block at the block location in the first image being duplicated in a block at the block location in a second image. The rate calculator can be configured to increment the rate value in response to the block in the second image being different from a block at the block location in a third image, the first image, the second image and the third image defining at least a portion of a stream of images transmitted from a host device to a client device. The apparatus can include an encoder selector configured to select, based on the rate value after the decrementing, an encoder for encoding the block of the first image.

In yet another general aspect, a computer-readable storage medium can be configured to store instructions that when executed cause a processor of a host device to perform a process. The instructions can include instructions to determine that a first region of a current image is identical to a first region of a prior image, and instructions to determine that a second region of the current image is different from a second region of the prior image. The instructions can also include instructions to calculate, in response to the determination that the second region of the current image is different, a rate of change associated with the portion of the second region, and instructions to identify a portion of the second region of the current image for encoding based on the rate of change associated with the portion of the second region of the current image based on a threshold value.

The details of one or more implementations are set forth in the accompanying drawings and the description below. Other features will be apparent from the description and drawings, and from the claims.

BRIEF DESCRIPTION OF THE DRAWINGS

FIG. 2A is a diagram that illustrates blocks of a current image portion, according to an embodiment.

DETAILED DESCRIPTION

Figure 1:
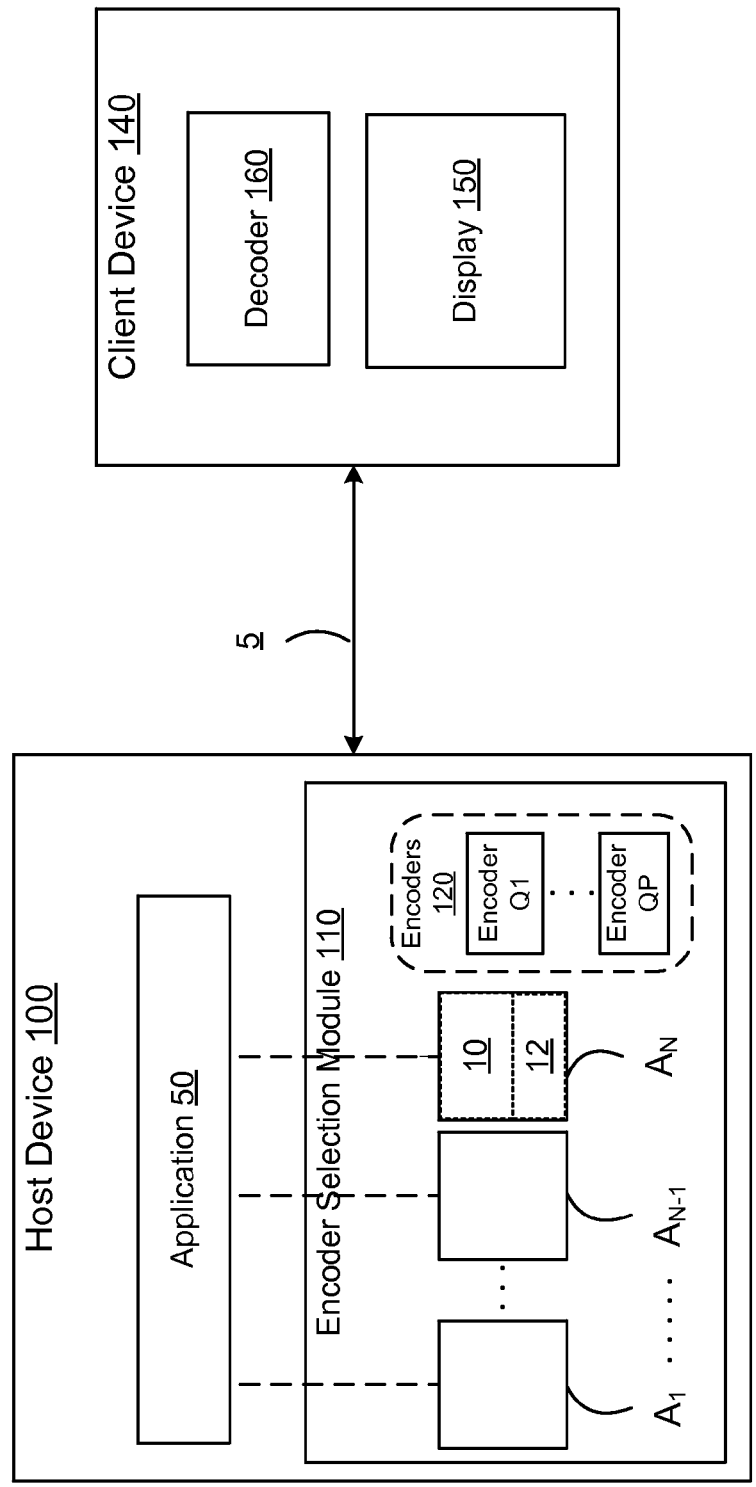
FIG. 1 is a diagram that illustrates an encoder selection module associated with a host device and a client device.

FIG. 1 is a diagram that illustrates an encoder selection module 110 associated with a host device 100 and a client device 140. The client device 140, in this embodiment, is configured to operate as a client (e.g., a thin client) of the host device 100 via, for example, a remote desktop session. The client device 140 can be used to interact with an application 50 operating at the host device 100 via a communication link 5, and the host device 100 can be configured to send to the client device 140 a stream of images (e.g., screen scrapes, screenshots) (also can be referred to as a stream of frames) representing responses to interactions with the application 50 during a remote desktop session. Accordingly, the processing resources of the host device 100 can be used by the client device 140 to operate the application 50 via the communication link 5 during the remote desktop session. In other words, the stream of images can be screenshots that are updated as the client device 140 is used to interact with the application 50 operating at the host device 100. In some embodiments, the communication link 5 can be, for example, a wireless communication link, a wired communication link, a network communication link, and/or so forth. As used herein, the term "remote desktop session" can include any technologies and/or protocols in which commands (e.g., input values) issued from a local client are used to control the functionality (e.g., operation) of a host device (e.g., host device 100) including, for example, Windows Remote Desktop™, Citrix™, WebEx™ etc. technologies and/or protocols.

For example, a user interface associated with the application 50 can be generated at the host device 100 operating the application 50. The client device 140 and/or a user interface device (e.g., a mouse device, a keyboard device, a touchpad device) coupled thereto can be used by a user to interact with the user interface of the application 50 via the communication link 5 during a remote desktop session. Images of the user interface, and interactions with the user interface (which can result in changes to the user interface), can be streamed, via the communication link 5, to the client device 140 where they can be displayed on the display 150. In some embodiments, the stream of images can, for example, define, or can be used to define, images in a video stream.

The encoder selection module 110 of the host device 100 is configured to identify portions (e.g., a block, a region) of a stream of images (sent from the host device 100 to the client device 140) for encoding based on different encoding schemes (e.g., techniques). The different encoding schemes can be implemented by different encoders 120 (which include encoder Q1 through encoder QP) within the encoder selection module 110. In some embodiments, the encoders can be, or can be configured to implement, one or more encoding procedures (e.g., encoding algorithms). The encoder selection module 110 is configured to determine (e.g., determine based on hash values) a rate of change of portions of a stream of images sent from the host device 100 to client device 140 so that the image data sent from the host device 100 to client device 140 via the communication link 5 can be reduced by, for example, sending image data that includes different encoding (e.g., compression) for the different portions. In other words, portions of the stream of images can be analyzed, and encoding for (e.g., encoding customized for) the portions of the stream of images can be selected based on the analysis. This can be referred to as analysis for encoding selection (e.g., encoding algorithm selection, encoding procedure selection).

As shown in FIG. 1, the client device 140 includes a decoder 160. The decoder 160 is configured to decode portions of a stream of images encoded by one or more of the encoders 120 and received at the client device 140. For example, a portion of an image that is encoding using encoder Q1 can be associated with an indicator that the encoder Q1 was used to encode the portion of the image. The portion of the image can be sent from the host device 100 to the client device 140 via the communication link 5. The indicator of the use of the encoder Q1 to encode the portion of the image can be received at the client device 140 and used by the decoder 160 (or a portion thereof) to decode the portion of the image. Although not shown, in some embodiments, a decoder specific to (or corresponding with) the encoder Q1 can be used to decode blocks encoded by the encoder Q1. In some embodiments, decoding can be a reverse process (or substantially reverse process) of encoding. In other words, a process of encoding included in an encoding algorithm can be reversed in a process of a decoding algorithm.

For example, regions with rapid change between images in a stream of images can be encoded using a discrete cosine transform (DCT) encoding algorithm, while other regions with little (or relatively little) change between the images in the stream of images can be encoded by identifying duplicated blocks that are offset by vectors. Thus, the image data can include, for example, a relatively small amount of metadata (e.g., instructions, movement data) for blocks (or other portions) that have simply shifted x-y position between images in the relatively unchanged regions, and a relatively large amount of encoded data for the rapidly changing regions (with little or no duplication). The regions with relatively rapid change between images in a stream of images can be referred to as volatile regions (e.g., volatile block locations), and the regions with relatively little change between images in the stream of images can be referred to as stable regions (e.g., stable block locations). Designation of a region as a volatile region or as a stable region can be referred to as a volatility designation.

As a specific example, a word processing application (i.e., application 50) can be operating at the host device 100 and controlled at the host device 100 using the client device 140 during a remote desktop session. A user interface associated with the word processing application can be moved (e.g., dragged), without being modified, using a mouse device (not shown) of the client device 140 to expose a video playing in the background (behind the user interface). A stream of images (or images) of the movement of the user interface exposing the video playing in the background can be produced at the host device 100 and sent to the client device 140 for display on the display 150. The portions of the stream of images associated with the video can be referred to as volatile portions because of the relatively rapid change in images associated with the video. In contrast, the portions of the stream of images associated with the moved user interface can be referred to as stable portions because of the relatively small (or relatively infrequent) change in images associated with the movement of the user interface.

Because the user interface is simply being moved (and is not modified), the representation of the user interface will be identical (e.g., duplicated) within each image of the stream of images except for x-y position of the user interface. Rather than entirely sending each of the images (or encoded version thereof) from the stream of images separately via the communication link 5, the encoder selection module 110 can be used to characterize the movement of the user interface within each image of the stream of images so that the user interface portion within each of the images will not have to be separately sent to the client device 140. Instead, the user interface that is duplicated within each of the images may be sent to (and received at) the client device 140 once and reused at the client device 140 within each of the images (based on the characterization of the movement using, for example, metadata) as they are displayed at the client device 140. In contrast, the volatile regions of the stream of images associated with the video, as it is being exposed, can be encoded within each of the images.

Although much of this detailed description discusses volatility designations in terms of volatile or stable, many levels of volatility can be used. For example, the volatility of a region (or block at a particular block location within a stream of images) can be characterized on a scale (e.g., a numbered scale, an alphanumeric scale) that includes more than two volatility designations.

As shown in FIG. 1, images $A_1$ through $A_N$ can define at least a portion of an image stream sent from the host device 100 to the client device 140. As illustrated by the dashed lines, images $A_1$ through $A_N$ can be associated with an application 50, which can be a word processing application, an operating system, a web browsing application, and/or so forth. For example, the images $A_1$ through $A_N$ can be, or can include, at least a portion of a user interface (e.g., a desktop, a graphical user interface, an interactive interface) associated with the application 50. In some embodiments, the images $A_1$ through $A_N$ can be associated with multiple applications (not shown) operating at the host device 100.

Images $A_1$ through $A_{N-1}$ are images produced prior to the image $A_N$ within the image stream. Accordingly, the image $A_1$ through $A_{N-1}$ can be referred to as a previous or prior images (with respect to the image $A_N$), and the image $A_N$ can be referred to as a subsequent image (with respect to the images $A_1$ through $A_N$) or as a current image. In this embodiment, the image $A_{N-1}$ is immediately prior to (e.g., adjacent in time to, consecutive to) the image $A_N$ within the stream of images.

As shown in FIG. 1, the encoder selection module 110 can be configured to identify (e.g., determine) region 10 as a region to be encoded based on one of the encoders 120 and the encoder selection module 110 can be configured to identify (e.g., determine) region 12 as a region to be encoded based on another of the encoders 120. The determination can be made based on a rate (e.g., a frequency) that each of the regions 10, 12 (or portions thereof) changes within the stream of images. The rate of change can be determined based on a comparison of portions of the current image $A_N$ with the prior images $A_1$ through $A_{N-1}$. The rate of change can be a quantification of a volatility of the portions of the images.

For example, region 10 within current image $A_N$ can be compared with corresponding regions within the prior images $A_1$ through $A_{N-1}$ by the encoder selection module 110 to determine that region 10 is a highly volatile region. Because region 10 is designated by the encoder selection module 110 as a highly volatile region, the region 10 can be encoded by encoder Q1 (which can be configured to encode highly voltage regions of an image). Region 12 within current image $A_N$ can be compared with corresponding regions within the prior images $A_1$ through $A_{N-1}$ by the encoder selection module 110 to determine that region 12 is a stable region. Because region 12 is designated by the encoder selection module 110 as a stable region, the region 12 can be encoded by encoder QP (which can be configured to encode (e.g., efficiently encode) stable regions of an image).

The host device 100 and/or the client device 140 can be, for example, a wired device and/or a wireless device (e.g., wi-fi enabled device) and can be, for example, a computing entity (e.g., a personal computing device), a mobile phone, a personal digital assistant (PDA), a server device (e.g., a web server), and/or so forth. The host device 100 and/or the client device 140 can be configured to operate based on one or more platforms (e.g., one or more similar or different platforms) that can include one or more types of hardware, software, firmware, operating systems, runtime libraries, and/or so forth. In some implementations, the host device 100 and/or the client device 140 can represent a cluster of devices (e.g., a server farm). In such an implementation, the functionality and processing of the host device 100 and/or the client device 140 can be distributed to several devices of the cluster of devices. Although not shown in FIG. 1, the encoder selection module 110 can be configured to function (e.g., operate) separately from the host device 100 and/or the client device 140 on another device (not shown).

In some embodiments, the comparisons of current images with prior images to determine which portions are volatile or stable can be performed on a block-by-block basis. For example, a block (or characteristics (e.g., color, brightness, etc.) thereof) in a current image can be compared with blocks in prior images to determine whether or not the block of the current image should be designated as being volatile or stable. The block in the current image can be at a location (also can be referred to as a block location) within the current image that corresponds with block locations of the blocks in the prior images. In some embodiments, the block location can be specified by, for example, x-y coordinates.

In some embodiments, a block can be defined by a set of pixels (e.g., bitmap pixels). For example, a block can be an 8×8 set of pixels, an 8×16 set of pixels, a 16×16 set of pixels, and so forth. In some embodiments, the block can have a different shape than a square or rectangle. For example, the block can be a 5-sided block. In some embodiments, the block can have a size that is a fraction (e.g., 0.3 times, 0.1 times, 0.01 times) of a size of an image (e.g., image A1).

In some embodiments, some portions of the current image $A_N$ may not be considered for encoding based on one or more of the encoders 120. In some embodiments, portions of the current image $A_N$ that are identical to (and in a corresponding block location to) portions of the prior image $A_{N-1}$ may not be considered for encoding based on one or more of the encoders 120. More details related to regions of an image that are not considered for encoding selection by the encoder selection module 110 are described in connection with, for example, FIGS. 2A through 2C.

In some embodiments, one or more of the encoders 120 may be selected for encoding based on a volatility designation of a portion of (e.g., a block at a block location within) the stream of images. For example, encoder Q1 can be configured to efficiently encode a relatively volatile portion of the stream of images, but may not be configured to efficiently encode a relatively stable portion (e.g., stable block location) of the stream of images. Accordingly, the encoder Q1 may be selected for encoding of a portion of the current image AN that is designated as a highly volatile portion.

In some embodiments, a specified number of blocks of a stream of images can be designated for encoding by a particular encoder based on a volatility designation for, for example, a single block within a single image. For example, a block at a specified block location within an image from a stream of images can be designated for encoding based on, for example, encoder Q1 in response to a volatility designation. Based on the designation of the block having the specified block location within the image for encoding based on the encoder Q1, several blocks also having the specified block location (or other block locations (e.g., adjacent block locations)) within one or more subsequent images from the stream of images can also be designated for encoding based on the encoder Q1. In some embodiments, the encoding can be performed based on the encoder Q1 despite differences, or changes, in volatility designations of the subsequent images.

Figure 2B:
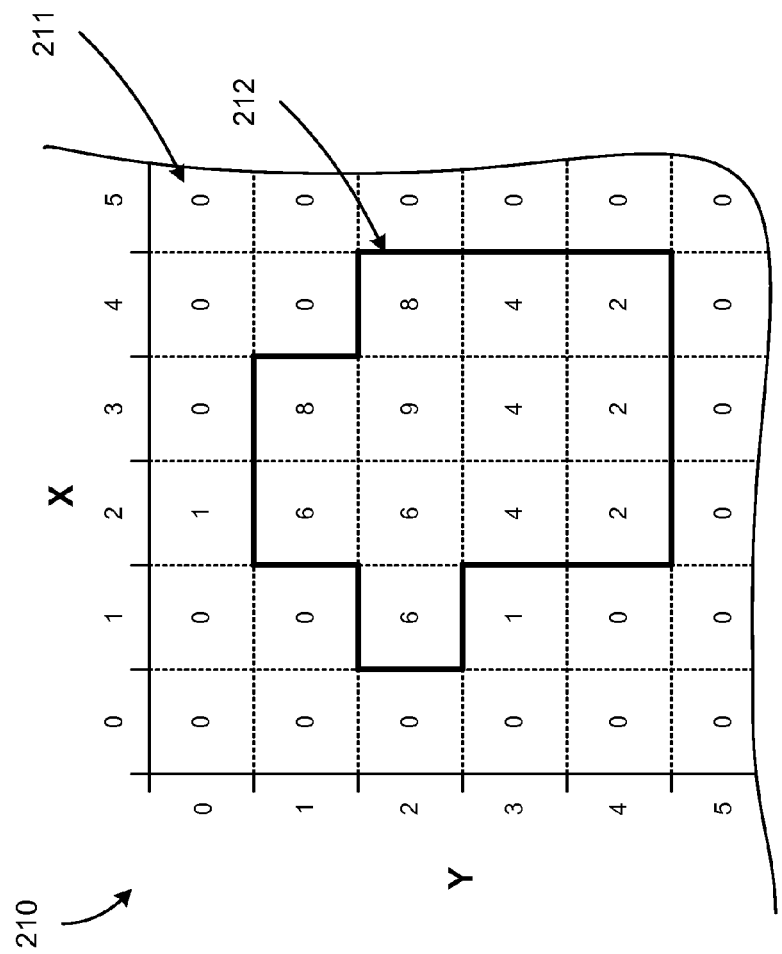
FIG. 2B is a diagram that illustrates rate values for each of the blocks of the current image portion shown in FIG. 2A, according to an embodiment.

FIG. 2A is a diagram that illustrates blocks of a current image portion 210, according to an embodiment. As shown in FIG. 2A, the current image portion 210 is divided into a grid of blocks with x-coordinates and y-coordinates. The blocks can be identified by a combination of x-y coordinates. For example, the upper left block can be referred to as a block at (0,0) or as block (0,0). In some embodiments, the blocks can be, for example, an 8×8 set of pixels, an 8×16 set of pixels, a 16×16 set of pixels, and so forth. In some embodiments, the blocks can have a different shape than a square or rectangle. Although not shown in FIGS. 2A through 2C, in some embodiments, one or more blocks of the grid can have overlapping pixels rather than mutually exclusive blocks (or sets) of pixels.

The current image portion 210 can be compared with a prior image portion (not shown) corresponding with the current image portion 210. A comparison value can be defined and associated with each of the blocks to identify which blocks (at corresponding block locations) are duplicated between the current image portion 210 and the prior image portion, or which blocks (at corresponding block locations) are different between the current image portion 210 and prior image portion. In this embodiment, blocks of the current image portion 210 that are identical to corresponding blocks (e.g., blocks in a corresponding block location) of the prior image portion are designated with the letter "N" (as a comparison value) and blocks of the current image portion 210 that are different from corresponding blocks of the prior image portion are designated with the letter "Y" (as a comparison value). The blocks of the current image portion 210 that are different from corresponding blocks of the prior image portion are included in region 212.

In some embodiments, differences between the blocks of current image portion 210 and the prior image portion can be identified, for example, based on a pixel-by-pixel comparison associated with each of the blocks. In some embodiments, each of the pixels can be represented by bit values (e.g., red, green, blue (RGB) bit values) that can be compared with one another. For example, each of the pixels included in block (0,1) of the current image portion 210 can be compared with each of the pixels (at a corresponding bit location) included in the corresponding block of the prior image portion to determine whether or not there are differences between block (0,1) of the current image portion 210 and the corresponding block of the permit portion. In this embodiment, the block (0,1) of the current image portion 210 is the same (e.g., exact same) as the corresponding block of the prior image portion. Accordingly, the block (0,1) of the current image portion 210 includes the designation "N" (as a comparison value).

In some embodiments, hash values can be calculated for blocks of the current image portion 210 in compared with hash values of corresponding blocks (at corresponding or identical block locations) in the prior image portion to determine whether or not there are differences. In other words, differences between the blocks of the current image portion 210 and the prior image portion can be identified based on hash values calculated for each of the blocks of the respective images. In some embodiments, one or more hash values can be calculated based on the techniques described below in connection with, for example, FIGS. 5 through 8.

FIG. 2B is a diagram that illustrates rate values for each of the blocks of the current image portion 210 shown in FIG. 2A, according to an embodiment. The rate values can be rate values (also can be referred to as frequency values) that represent a number of times that each of the blocks has changed over a specified number of images (e.g., the last 50 images including the current image, the last 10 images) within a stream of images. In this embodiment, the rate values represent a number of times that each of the blocks has changed (e.g., is not identical) over the last 30 images. Accordingly, the rate values can represent a rate of change of the each of the blocks associated with the current image portion 210 over a specified number of images. In other words, the rate values can be calculated based on a historical (e.g., archived) window of data (e.g., rate values, counts) associated with a specified number of images.

For example, as shown in FIG. 2B, block (0,0) includes a rate value of 0, which can represent that block (0,0) (or a characteristic thereof) has not changed at all over the last 30 images. As another example, block (2,2) includes a rate value 6, which can represent that block (2,2) has changed six times over the last 30 images. In some embodiments, the rate values can be expressed as, for example, a number of changes per image (or images). In some embodiments, any type of value (e.g., statistical value, average value) that represents a rate of change of one or more of the blocks can be used in lieu of, or in conjunctions with, the rate values.

The rate values associated with a particular block within the current image portion 210 can be incremented based on the comparison performed as described in connection with FIG. 2A. For example, the rate value included in block (0,0) is not changed (e.g., is not increased) because block (0,0) is designated (as represented by the letter "N" in FIG. 2A) as being identical to the prior image portion. Similarly, the rate value included in block (1,3) is maintained at a rate value of 1 because block (1,3) is designated (as represented by the letter "N" in FIG. 2A) as being identical (or substantially identical) to the prior image portion. In contrast, the rate value included in block (2,2), however, can be increased (e.g., incremented) to a rate value 6 from a previous rate value of 5 because block (2,2) is designated (as represented by the letter "Y" in FIG. 2A) as being different (or substantially different) from the prior image portion.

In some embodiments, the rate values included in each of the blocks shown in FIG. 2B can be incremented or decremented based on the comparison performed in connection with FIG. 2A. For example, each time a block is changed when compared with a previous image (e.g., and immediately prior image), the rate value associated with the block can be incremented. Also, each time the block has not changed when compared with the previous image, the rate value associate the block can be decremented. In some embodiments, the rate value can be decremented to a minimum value (e.g., a minimum value of zero) and/or can be incremented to a maximum value (e.g., a maximum value of 100). Thus, the rate values can represent a rate of change of a particular block (over a non-specified number of images). The rate values can be continually incremented and/or decremented to represent a rate of change of a particular block.

In some embodiments, one or more rate values can be calculated based on a sliding window of images. For example, a rate value can be calculated for blocks at a block location within the last several images (e.g., last 10 images, last 50 images).

Figure 2C:
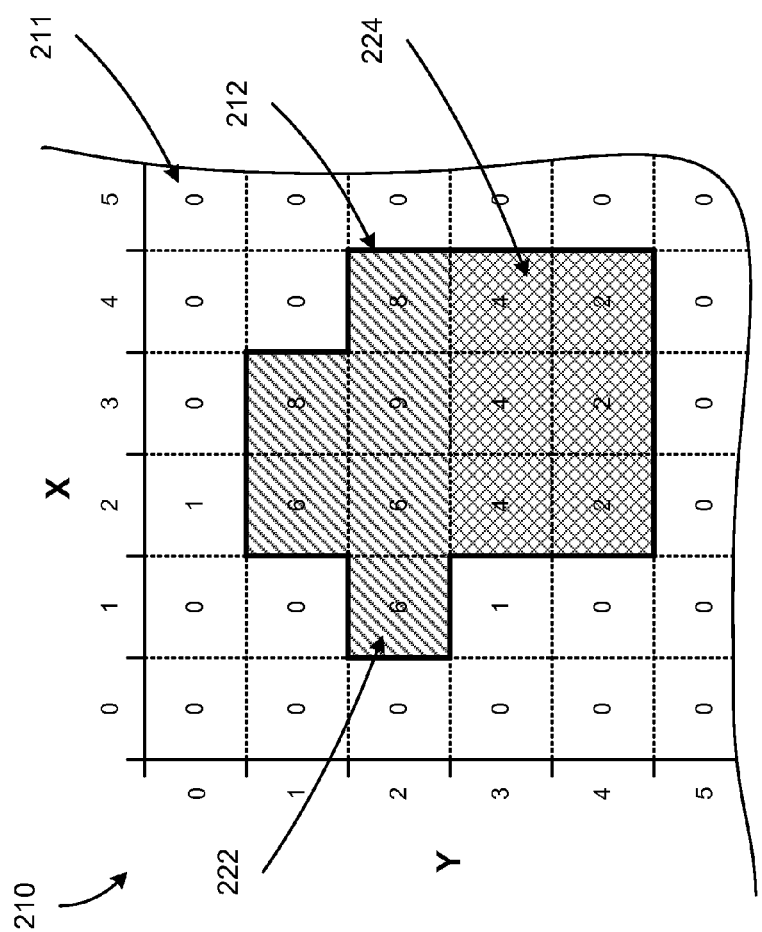
FIG. 2C is a diagram that illustrates blocks of the current image portion shown in FIGS. 2A and 2B designated for encoding using an encoder, according to an embodiment.

FIG. 2C is a diagram that illustrates blocks of the current image portion 210 designated for encoding using an encoder, according to an embodiment. The blocks are designated for encoding using one or more encoders based on a condition being satisfied (or unsatisfied). In some embodiments, the condition can be referred to as an encoder selection condition. In this embodiment, the condition is based on a threshold rate value of 5. Blocks with rate values greater or equal to the threshold value of 5 are designated for encoding using a first encoder, and blocks with rate values less than the threshold value of 5 are designated for encoding using a second encoder. Thus, a portion 222 of the region 212 that includes blocks with rate values greater than or equal to the threshold value of 5 are designated for encoding using the first encoder, and a portion 224 of the region 212 that includes blocks with rate values that are less than the threshold value of 5 are designated for encoding using the second encoder. As a specific example, the portion 222 of the region 212 that includes blocks with rate values greater than or equal to the threshold value of 5 can be designated for encoding using, for example, a DCT encoding algorithm. The portion 224 of the region 212 that includes blocks with rate values that are less than the threshold value of 5 can be designated for encoding using a match encoder (e.g., match encoder configured to implement a match algorithm). More details related to a match encoder and algorithm are set forth in connection with FIGS. 5 through 8.

In this embodiment, the blocks included in the region 212 are designated for encoding based on one of two encoders. In some embodiments, blocks included in an image can be encoded based on more than two types of encoders (e.g., encoding schemes/procedures/algorithms). For example, a first set of blocks included in an image can be encoded based on a first encoder, a second set of blocks can be encoded based on a second encoder, and a third set of blocks can be encoded based on a third encoder. In such embodiments, each of the encoders can be associated with a different threshold rate value.

In some embodiments, indicators of the different types of encoding can be associated with the blocks by, for example, a host device so that the blocks can be decoded (e.g., decoded in an appropriate fashion) at a client device using one or more decoders. For example, a first decoder can be used to decode a block encoded by the first encoder, a second decoder can be used to decode a block encoded by the second encoder, and so forth.

Because the blocks outside of the region 212 have not changed from the prior image portion, in this embodiment, the blocks outside of the region 212 are not designated for encoding based on an encoder. Thus, blocks that have not changed in the current image portion 210 from the prior image portion are not analyzed (e.g., not analyzed by the encoder selection module 110 shown in FIG. 1) for encoding by one or more encoders. In some embodiments, the region 212 of the current image portion 210 that is analyzed for encoding selection (e.g., by the encoder selection module 110 shown in FIG. 1) can be referred to as an analyzed region, and region 211 of the current image portion 210 that is not analyzed for encoding selection (e.g., by the encoder selection module 110 shown in FIG. 1) can be referred to as a non-analyzed region.

In some embodiments, an indicator can be associated the region 211 by, for example, a host device so that decoding of the region 211 may not be performed at a client device. Instead, an instance (e.g., a copy) of the prior image portion stored at, for example, the client device can be retrieved for the region 211 and used in a displayed image at the client device.

In some embodiments, blocks outside of the region 212 can be designated for encoding based on one or more encoders. For example, in some embodiments, blocks outside of the region 212 (in region 211) can be designated for encoding (at a host device) based on a default encoder associated with blocks of the current image portion 210 that have not changed from (e.g., are identical to) the prior image portion. Decoding of blocks outside of the region 212 can be performed at, for example, a client device using, for example, a default decoder (that can correspond with the default encoder).

Figure 3:
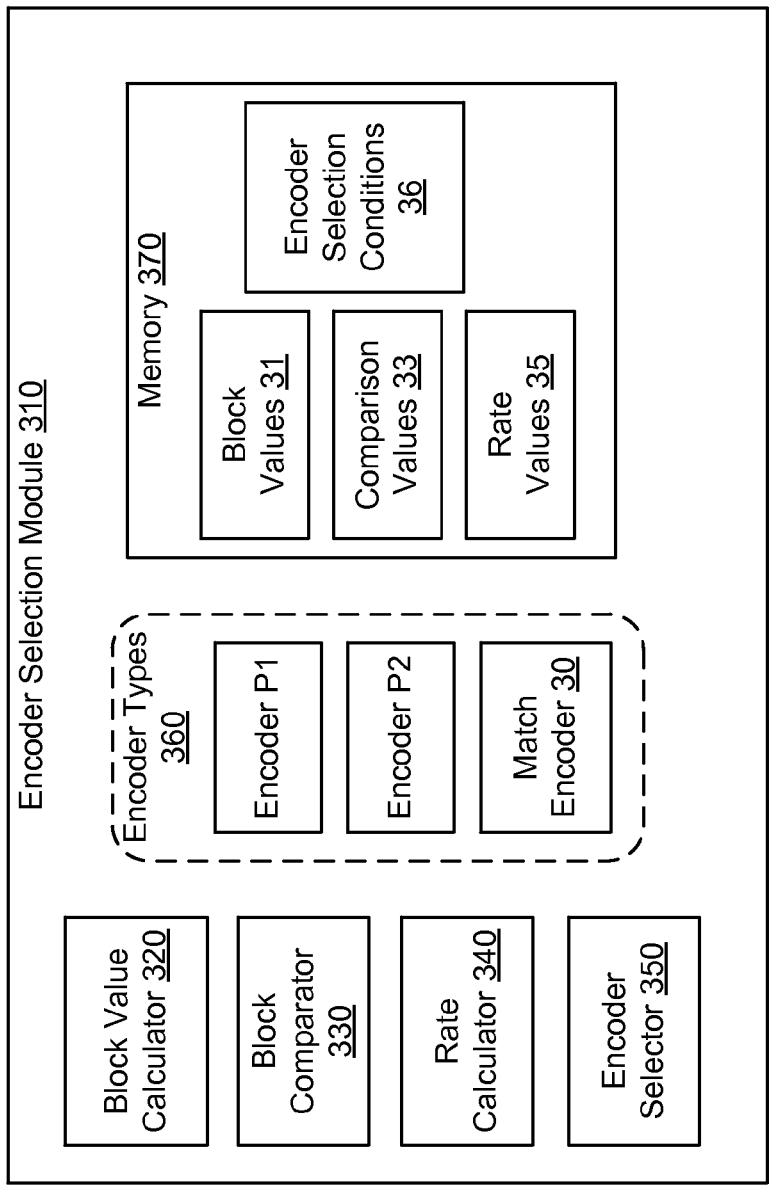
FIG. 3 is a diagram that illustrates an encoder selection module, according to an embodiment.

FIG. 3 is a diagram that illustrates an encoder selection module 310, according to an embodiment. As shown in FIG. 3, the encoder selection module 310 includes a block value calculator 320. The block value calculator 320 is configured to calculate one or more block values 31 related to images (e.g., a current image, prior images) that can be stored in a block value database (not shown). The block values 31 can be stored in a memory 370 associated with the encoder selection module 310. The block values 31 can be used by the block comparator 330 to compare blocks of a current image with blocks of one or more prior images.

The block values 31 can be, for example, individual pixel values, collections of pixel values, hash values calculated based on pixel values included in blocks, and/or so forth. If the block values 31 are hash values, the hash values of the blocks can then be compared to determine whether or not the blocks (or characteristics thereof) are matching or are different. In some embodiments, the block values 31 can be bit values representing aspects of a block such as an approximation of an image within a block, colors associated with the block, and/or so forth.

As shown in FIG. 3, the encoder selection module 310 also includes a block comparator 330. The block comparator 330 is configured to compare one or more of the block values 31 to determine whether blocks within images (e.g., the current image, prior images) are duplicated (or are substantially similar) or are different (or are substantially different). The block comparator 330 can be configured to assign one or more comparison values 33 (stored in the memory 370) to blocks after the blocks values have been used to identify whether or not blocks are duplicated (or are substantially similar) or different (or are substantially different). The comparison values 33 can be used to efficiently identify whether or not blocks are duplicated (or are substantially similar) or are different (or are substantially different). Specifically, the block comparator 330 can be configured to identify blocks in a current image that are duplicates of blocks in a prior image (e.g., a prior image consecutive to the current image) based on the block values 31 and/or to identify blocks in the current image that are different from blocks in a prior image (e.g., a prior image consecutive to the current image) based on the block values 31. A block in the current image that is a duplicate of a block (e.g., a block with a corresponding block location) in the prior image can be associated with (e.g., assigned with) one of the comparison values 33 that can be used to later identify the block in the current image as a duplicate of the block of the prior image. Similarly, a block in the current image that is different from a block (e.g., a block with a corresponding block location) in the prior image can be associated with (e.g., assigned with) one of the comparison values 33 that can be used to later identify the block in the current image as being different from the block of the prior image.

The comparison values 33, which can be used identify blocks of a current image as duplicates of blocks in a prior image or identify blocks of the current image as different from blocks in the prior image, can be used by a rate calculator 340 of the encoder selection module 310 to calculate a volatility of each of the blocks of the current image. The volatility of each of the blocks of the current image can be represented using one or more rate values 35 stored in the memory 370. For example, a series of comparison values associated with blocks in a particular block location within a series of images (e.g., a stream of images) can be used to determine a rate of change of the blocks in the particular block location. As additional images are received, the rate of change of the blocks in a particular block location can be updated. In some embodiments, comparison values 33 identifying differences can be used to increase one of the rate values 35 representing a rate of change, and comparison values 33 identifying duplicates can be used to decrease one of the rate values 35 representing the rate of change.

As shown in FIG. 3, the encoder selection module 310 includes an encoder selector 350 configured to select one or more of the encoders 360 (also can be referred to as encoder types) for encoding of blocks in a current image. Specifically, the encoder selector 350 is configured to select the one or more encoders 360 for encoding of a block in a current image in response to one or more encoder selection conditions 36 being satisfied (or unsatisfied) based on one or more of the rate values 35. For example, encoder P1 from the encoders 360 can be selected for encoding of a block in a current image in response to one of the rate values 35 satisfying one of the encoder selection conditions 36 (e.g., one of the rate values 35 being greater than or less than a threshold value included in one of the encoder selection conditions 36). Match encoder 30 from the encoders 360 can be selected for encoding another block in the current image in response to another of the rate values 35 satisfying another of the encoder selection conditions 36.

In some embodiments, the encoder selector 350 may be configured to select one or more of the encoders 360 only for blocks that have changed. Specifically, the encoder selector 350 can be configured to select one of the encoders 360 for encoding of a block in a current image that has changed from a prior image that is immediately before (e.g., consecutive to) the current image. The encoder selector 350 may not, however, select one of the encoders 360 for encoding of a block in the current image that has not changed from the prior image.

As a specific example, the block value calculator 320 can be configured to calculate a first hash value for a block of a current image based on pixel values associated with the block of the current image, and can store the first hash value as one of the block values 31. The block value calculator 320 can be configured to calculate a second hash value for a block of the prior image (consecutive to the current image within a stream of images) based on pixel values associated with the block of the prior image, and can store the second hash value as one of block values 31. The block of the current image can have a block location within the current image that corresponds with (e.g., is identical to) a block location of the block of the prior image. The first hash value can be compared with the second hash value by the block comparator 330 to determine that the block of the current image is different from the block of the prior image. A comparison value 33 indicating that the block of the current image is different from the block of the prior image can be stored in the memory 370 by the block comparator 330. The comparison value 33 can be used in conjunction with other comparison values 33 associated with several images prior to the current image to calculate a rate of change (also can be referred to as a frequency of change) of blocks at the block location corresponding with the block of the current image. The rate of change can be stored as one of the rate values 35 in the memory 370. The encoder selector 350 can select, for example, encoder P2 from the encoders 360 for encoding of the block of the current image based on the rate of change satisfying at least one of the encoder selection conditions 36 stored in the memory 370.

In some embodiments, one or more of the encoder selection conditions 36 can be satisfied in response to a rate of change is over a specified number of images within a stream of images and/or in response to a block within a stream of images changes consecutively specified number of times. In some embodiments, one or more of the encoder selection conditions 36 can be satisfied in response to a block at a particular block location within a stream of images has a specified rate of change, or changes in a particular fashion (e.g., more than a specified number of pixels change). In some embodiments, one or more of the encoder selection conditions 36 can be satisfied in response to blocks around (e.g., adjacent to) a block within a stream of images having a specified rate of change.

The encoder selection module 310 can be, or can include, various types of hardware and/or software. In some implementations, one or more portions of the components shown in the encoder selection module 310 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the encoder selection module 310 can be, or can include, a software module configured for execution by at least one processor (not shown). In some implementations, the functionality of the components can be included in different modules and/or components than those shown in FIG. 3. For example, although not shown, the functionality of the block value calculator 320 of the encoder selection module 310 can be included in a different module than the block value calculator 320 of the encoder selection module 310, or divided into several different modules.

Although not shown, in some implementations the encoder selection module 310 (or portions thereof) can be configured to operate within, for example, a data center (e.g., a cloud computing environment), a computer system, one or more server/host devices, and/or so forth. In some implementations, the encoder selection module 310 (or portions thereof) can be configured to operate within a network. Thus, the encoder selection module 310 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Although not shown, in some implementations, the memory 370 can be implemented as more than one memory component (e.g., more than one random-access memory (RAM) component or disk drive memory). In some implementations, the memory 370 can be a database memory. In some implementations, the memory 370 can be, or can include, a non-local memory. For example, the memory 370 can be, or can include, a memory shared by multiple devices (not shown). In some implementations, the memory 370 can be associated with a server device (not shown) within a network and configured to serve the encoder selection module 310.

Figure 4:
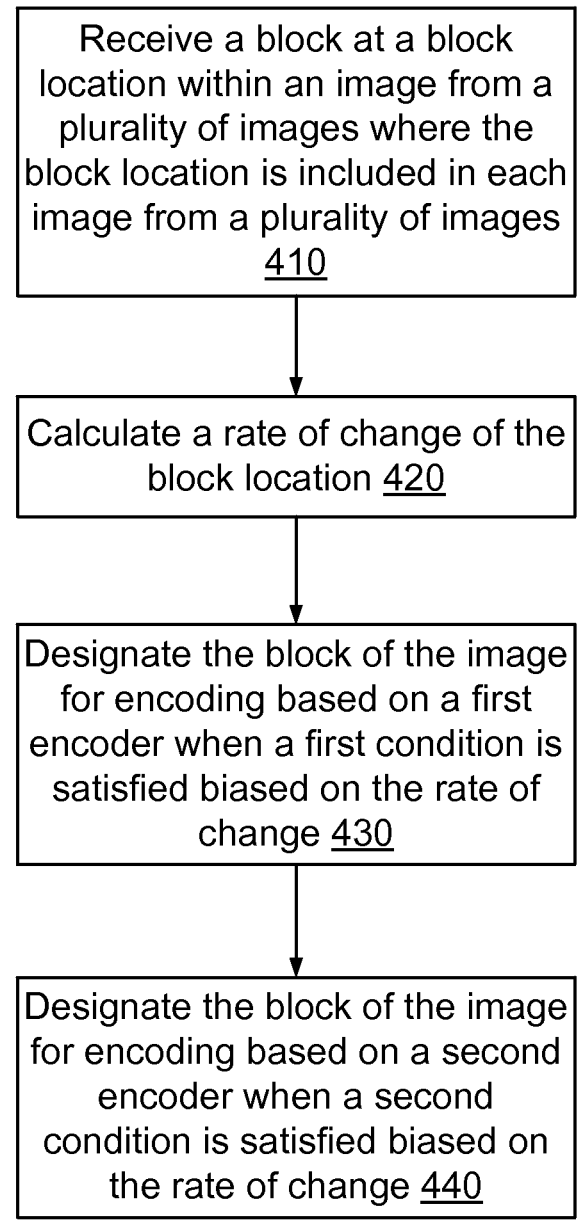
FIG. 4 is flowchart that illustrates a method for designating a block for encoding based on an encoder.

FIG. 4 is flowchart that illustrates a method for designating a block for encoding based on an encoder. At least some portions of the method can be performed by an encoder selection module (e.g., the encoder selection module 110 shown in FIG. 1, the encoder selection module 310 shown in FIG. 3).

A block at a block location within an image from a plurality of images is received where the block location is included in each image from a plurality of images (block 410). The block of the first image from the plurality of images can be received at, for example, the encoder selection module 310 shown in FIG. 3. In some embodiments, the plurality of images can define a stream of images. In some embodiments, the image can be referred to as a current image.

A rate of change of the block location is calculated (block 420). The rate of change of the block location can be calculated by a rate calculator (e.g., rate calculator 340 shown in FIG. 3) based on block values. The block values can be calculated by a block value calculator (e.g., block value calculator 320 shown in FIG. 3). In some embodiments, the rate of change of the block location can be calculated based on a number of times that blocks of the plurality of images at the block location have changed within a specified number of images. In some embodiments, the rate of change of the block location can be calculated based on incrementing or decrementing a rate value associated with the block location.

The block of the image can be designated for encoding based on a first encoder when a first condition is satisfied biased on the rate of change (block 430). The block of the image can be designated for encoding based on the first encoder by an encoder selector (e.g., encoder selector 350 shown in FIG. 3).

The block of the image can be designated for encoding based on a second encoder when a second condition is satisfied biased on the rate of change. The block of the image can be designated for encoding based on the second encoder by an encoder selector (e.g., encoder selector 350 shown in FIG. 3). In some embodiments, the first encoder can be, for example, a match encoder, and the second encoder can be a DCT encoder. In some embodiments, the first condition and the second condition can be collectively referred to as encoder selection conditions (e.g., encoder selection conditions 36 shown in FIG. 3). In some embodiments, the block of the image can be designated for encoding only when the block of the image is within a region that has changed from (that is not duplicated at any location within) a prior image. Although not shown in FIG. 3, in some embodiments, a block that is designated for encoding using a particular type of encoder can be decoded using a decoder corresponding with the encoder.

Figure 5:
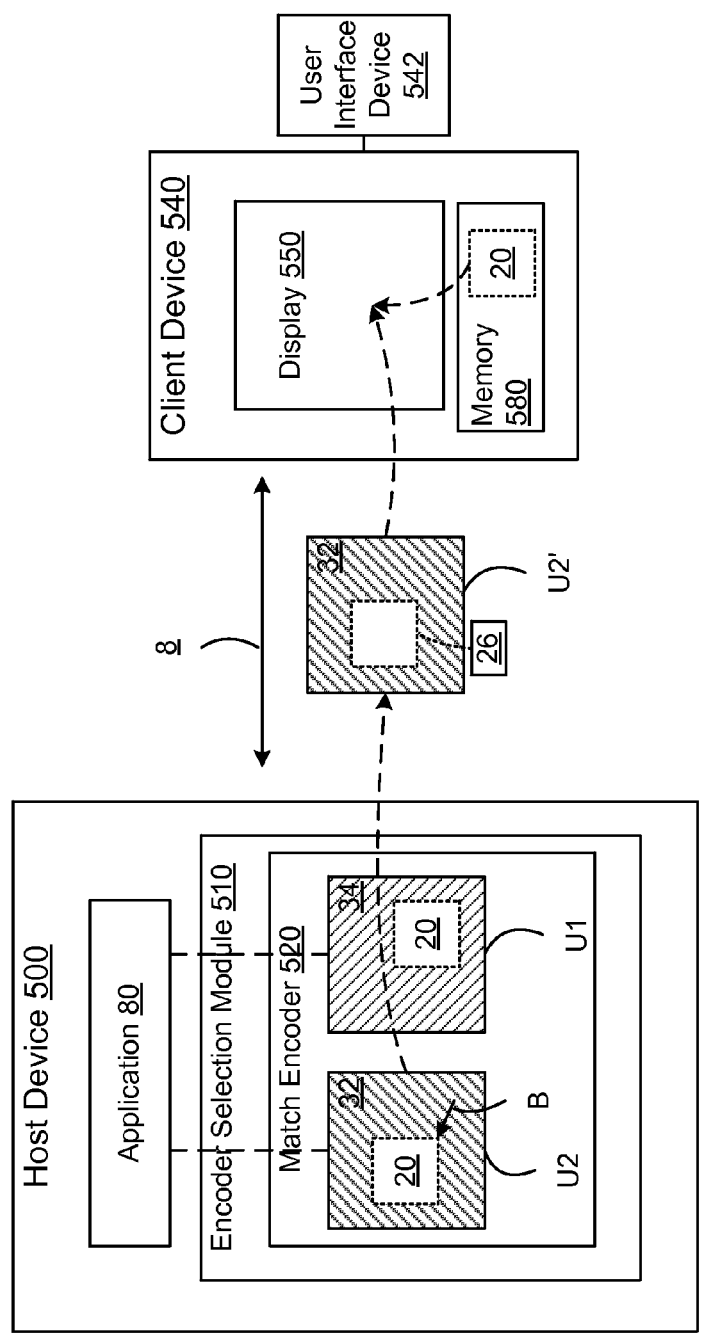
FIG. 5 is a diagram that illustrates a match encoder included in an encoder selection module that is associated with a host device and a client device.

FIG. 5 is a diagram that illustrates a match encoder 520 included in an encoder selection module 510 that is associated with a host device 500 and a client device 540. The match encoder 520 can be configured to identify matching regions between images of an image stream that have shifted within an x-y plane (and are at different block locations) between the images of the image stream. Encoding performed by the match encoder 520 can be referred to as match encoding. In some embodiments, encoding performed by the match encoder 520 can be performed within a region of an image identified as an analyzed region (e.g., region 212 shown in FIGS. 2A through 2C) but may not be performed on a region of an image identified as a non-analyzed region (e.g., region 211 shown in FIGS. 2A through 2C).

Similar to that described in connection with FIG. 1, the client device 540 can be configured to operate as a client (e.g., a thin client) of the host device 500 via, for example, a remote desktop session. The client device 540 can be used to interact with an application 80 operating at the host device 500 via a communication link 8, and the host device 500 can be configured to send to the client device 540 a stream of images (e.g., screen scrapes, screenshots) (also can be referred to as a stream of frames) representing responses to interactions with the application 80 during a remote desktop session.

The match encoder 520 can be one of several encoders selected by the encoder selection module 510 for encoding of a region (or regions) based on the region (e.g., block location) being identified as a volatile region (e.g., volatile block location) or as a stable region (e.g., stable block location). For example, the encoder selection module 510 of the host device 500 can be configured to identify portions (e.g., a block, a region) of a stream of images (sent from the host device 500 to the client device 540) for encoding based on different encoding schemes (e.g., techniques) including a match encoding scheme implemented by the match encoder 520 or another encoder (not shown).

As a specific example, volatile regions within a stream of images can be encoded using a discrete cosine transform (DCT) encoding algorithm implemented by a DCT encoder (not shown), while stable regions within the images in the stream of images can be encoded by the match encoder 520. Specifically, the match encoder 520 can be configured to identify duplicated blocks that are, for example, offset by x-y coordinates (between images), shifted within an x-y plane (between images), and so forth. Thus, image data for the duplicated blocks in the stable regions can be characterized by the match encoder 520 by relatively small amount of information related to the shift, while the volatile regions may be characterized by the DCT encoder using a relatively large amount of information fully encoding the volatile regions.

The match encoder 520 of the host device 500 is configured to identify at least a portion (e.g., a block, a region) of a stream of images (sent from the host device 500 to the client device 540) that is duplicated within several images of the stream of images (but have different block locations because they have moved between images). The match encoder 520 is configured to identify (e.g., identify based on hash values) regions that are duplicated within images of a stream of images sent from the host device 500 to client device 540 so that the image data sent from the host device 500 to client device 540 via the communication link 8 can be reduced by, for example, sending image data that includes encoding (e.g., compression) of only non-duplicated regions. The image data can include a relatively small amount of metadata (e.g., instructions, movement data), compared with encoded image data, that identifies the duplicated regions from previous images buffered at the client device 540 from the stream of images that can be reused at the client device 540 in subsequent images of the stream of images.

As a specific example, a word processing application (i.e., application 80) can be operating at the host device 500 and controlled at the host device 500 using the client device 540 during a remote desktop session. A user interface associated with the word processing application can be moved (e.g., dragged), without being modified, using a mouse device (not shown) of the client device 540. A stream of images (or images) of the movement of the user interface can be produced at the host device 500 using the word processing application and sent to the client device 540 for display on the display 550. Because the user interface is simply being moved (and is not modified), the representation of the user interface will be identical (e.g., duplicated) within each image of the stream of images except for x-y position of the user interface. Rather than entirely sending each of the images from the stream of images separately via the communication link 8, the match encoder 520 can be used to characterize the movement of the user interface within the each of the images of the stream of images so that the user interface portion within each of the images will not have to be separately sent to the client device 540. Instead, only the portions of the images, such as background portions (which can be encoded) around the user interface, will be sent to (e.g., sent in a compressed form to) the client device 540. The user interface that is duplicated within each of the images may be sent to (and received at) the client device 540 once and reused at the client device 540 within each of the images (based on the characterization of the movement using, for example, metadata) as they are displayed at the client device 540.

As shown in FIG. 5, images U1, U2 can define at least a portion of an image stream sent from the host device 500 to the client device 540. As illustrated by the dashed lines, images U1, U2 can be associated with an application 80, which can be a word processing application, an operating system, a web browsing application, and/or so forth. For example, the images U1, U2 can be, or can include, at least a portion of a user interface (e.g., a desktop, a graphical user interface, an interactive interface) associated with the application 80. In some embodiments, the images U1, U2 can be associated with multiple applications (not shown) operating at the host device 500.

In this embodiment, the match encoder 520 is configured to identify (e.g., determine) a region 20 (also can be referred to as a portion) that is included in both image U1 and image U2. The image U1 is an image produced prior to the image U2 within the image stream. Accordingly, the image U1 can be referred to as a previous or prior image (with respect to the image U2), and the image U2 can be referred to as a subsequent image (with respect to the image U1) or as a current image. As shown in FIG. 5, the match encoder 520 is configured to identify (e.g., determine) that region 20 is duplicated within the current image U2 from the prior image U1 and identify (e.g., determine) that the region 20 is displaced within the current image U2 (from the prior image U1) by an offset value(s) (e.g., an offset value represented with x-y coordinates) represented by vector B.

When images are sent from the host device to the client device 540 via the communication link 8 as a stream of images, portions of the images (such as a portion of a user interface) that are duplicated within one another can be identified as having moved within (e.g., moved between) the images by an offset (e.g., an x-y offset) (or as remaining in the same position within images). In some embodiments, the movement of the duplicated portion between images can be characterized by movement data (e.g., metadata) that includes, for example, an offset value representing a vector (e.g., a magnitude and a direction) of the movement, a size of a block (e.g., region 20) that has moved, an original and/or target location of a block that has moved, and/or so forth.

Specifically, as shown in FIG. 5, only the portions 32 (or copies thereof) outside of the region 20 in the image U2 are sent to the client device 540 (shown as image U2') because the region 20 included in the image U2 is duplicated (but offset) from the image U1. The image U2' is represented within FIG. 5 as being in transit from the host device 500 to the client device 540 via the communication link 8. Rather than being sent via the communication link 8, the region 20 can be identified as a portion that has shifted (e.g., is at a different or non-corresponding location) within the image U2 from the prior image U1 by an offset (represented by vector B). Movement data 26, which is associated with image U2', characterizes the movement of the region 20 from the image U1. A copy of the region 20, which can be stored (e.g., cached, temporarily stored) within a memory 580 of the client device 540 can be inserted, based on the movement data 26, for display within the image U2' when received at the client device 540. The region 20, which is stored within the memory 580, can be from a prior image (e.g., image U1 or an earlier image) displayed at the display 550 of the client device 540. Thus, the movement data 26 can be defined as an instruction configured to trigger access, from the memory 580 at the client device 540, a copy of the region 20 to be reused from a prior image in response to the designation of the region 20 for duplication. Although not represented in FIG. 5, in some embodiments, the region 20 stored in the memory 580 can be an encoded (e.g., compressed) version of the region 20.

In some embodiments, the images U1, U2 can be, for example, bitmaps. Accordingly, the match encoder 520 can be configured to process bitmaps of the images U1, U2 to determine whether or not the images U1, U2 have matching regions (that have shifted by an offset). In some embodiments, the match encoder 520 can be configured to calculate hash values based on blocks of the images U1, U2 to determine whether or not one or more blocks of the images U1, U2 are identical (e.g., match) (but have shifted). Accordingly, matching regions can be identified by the match encoder 520 based on a block-by-block comparison. The match encoder 520 can be configured to produce an indicator of the matching regions. In some embodiments, the blocks that are used for comparison between images can be collections of pixels associated with portions the images (e.g., images U1, U2). More details related to block-by-block comparisons are described in more detail in connection with the figures below.

Figure 6A:
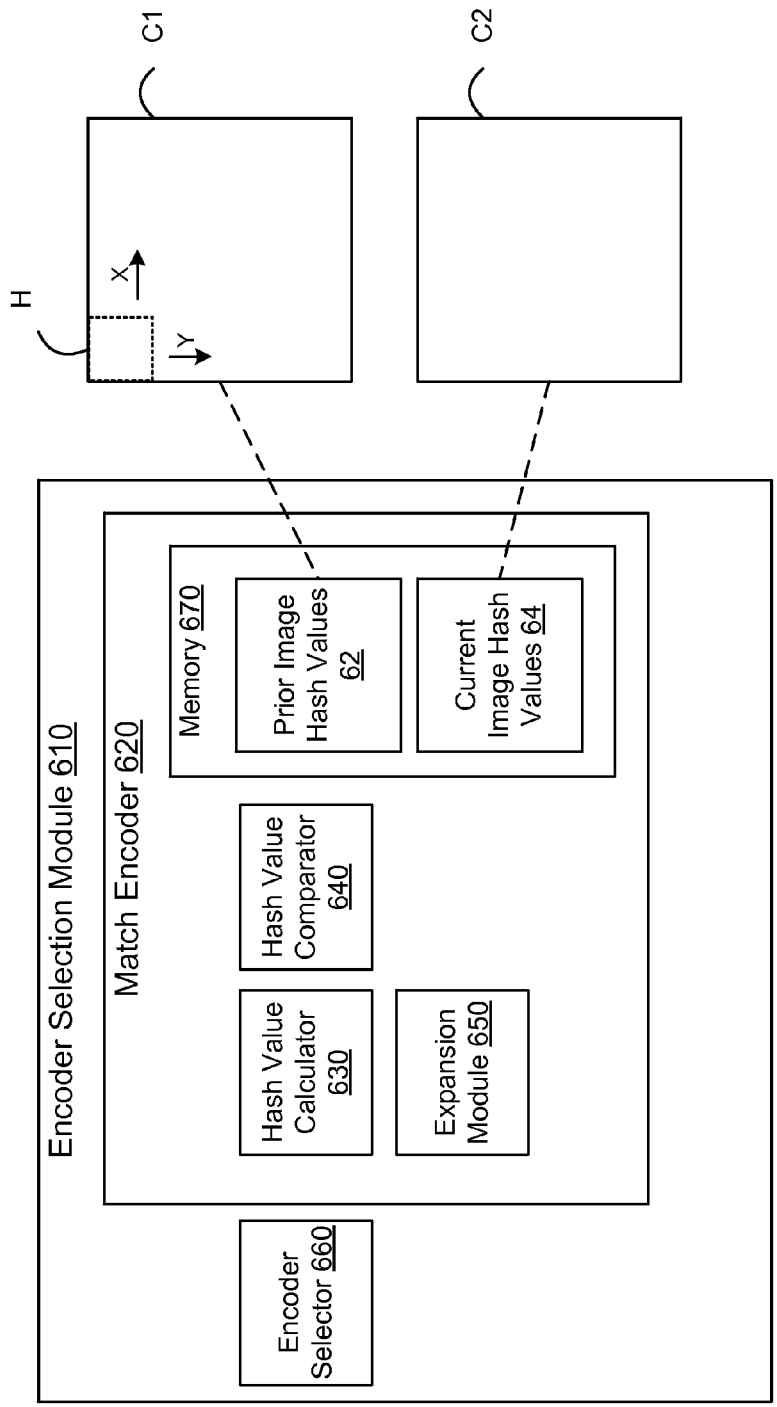
FIG. 6A is a block diagram that illustrates a match encoder configured to compare images associated with an image stream based on hash values associated with blocks of pixels.

FIG. 6A is a block diagram that illustrates a match encoder 620 configured to compare images associated with an image stream based on hash values associated with blocks of pixels. As shown in FIG. 6A, match module 610 includes a hash value calculator 630. The hash value calculator 630 is configured to calculate hash values for a prior image C1 and store the hash values of the prior image as prior image hash values 62. The prior image hash values 62 calculated by the hash value calculator 630 can each be based on a block H that has a size smaller than a size of the prior image C1. In some embodiments, the image stream can be associated with a remote desktop session between a client device (not shown) and a host device (not shown).

The hash values can be calculated for each combination of pixels that can be included in the area covered by block H (which can be referred to as a block window). For example, a hash value can be calculated for the set of pixel values included in the area covered by block H as shown in FIG. 6A. Hash values can be calculated for each set of pixel values within the prior image C1 by systematically shifting the area covered block H along direction X one column of pixels or systematically shifting block H along direction Y one row of pixels, and calculating a hash value with each shift. Accordingly, the hash values can be calculated by shifting the block H in a pattern (e.g., a scanning pattern) across the prior image C1. In some embodiments, the pattern can be referred to as a hash value calculation pattern.

In some embodiments, hash values can be calculated for less than all combinations of pixels that can be included in the area covered by block H. For example, an image can be divided into a grid of blocks and hash values can be calculated for each of the grid blocks. In some embodiments, hash values can be calculated for combinations of pixels that are offset by a specified amount (e.g., offset by a few pixels). In such embodiments, hash values can be calculated for less than all combinations of pixels that can be included in the area covered by block H, but hash values may be calculated for overlapping blocks.

In some embodiments, the hash value can be calculated using a rolling hash or additive hash procedure (e.g., algorithm). For example, a first hash value can be calculated based on pixel values associated with each pixel that is covered by block H when in a first position. When the block H is shifted to a second position (in the X direction or the Y direction), a second hash value can be calculated by subtracting pixel values associated with pixels that are no longer covered by the block H in the second position and adding pixel values associated with pixels that are covered by the shifted block H in the second position. In some embodiments, the hash value calculation procedure can be a version of Rabin-Karp's string matching procedure that has modified for multi-dimensional (e.g., two-dimensional, three-dimensional) calculations.

In some embodiments, the block H can be an 8×8 set of pixels, an 8×16 set of pixels, a 16×16 set of pixels, and so forth. In some embodiments, the block H can have a different shape than a square or rectangle. For example, the block H can be a 5-sided block. In some embodiments, the block H can have a size that is a fraction (e.g., 0.3 times, 0.1 times, 0.01 times) of a size of the images C1, C2. A more detailed example of hash value calculations associated with a block, such as block H, is described, for example, in connection with FIGS. 7A through 7C, and FIG. 8.

Figure 7B:
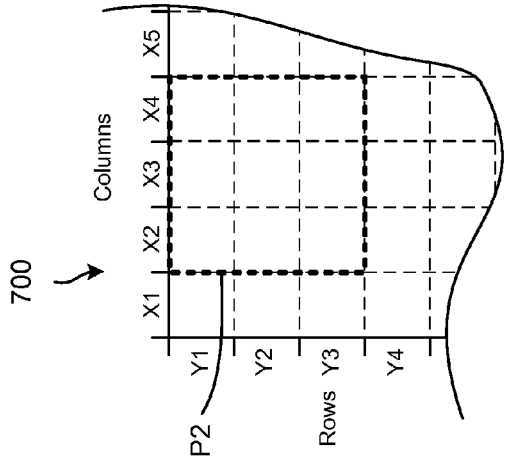
FIGS. 7A through 7C are diagrams that illustrate calculations of hash values of a portion of an image using a rolling hash procedure.
Figure 7C:
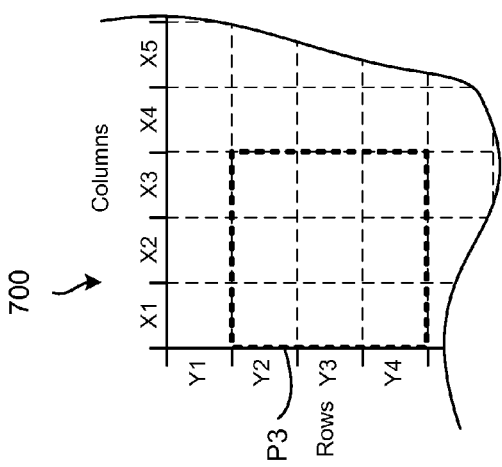
Figure 7A:
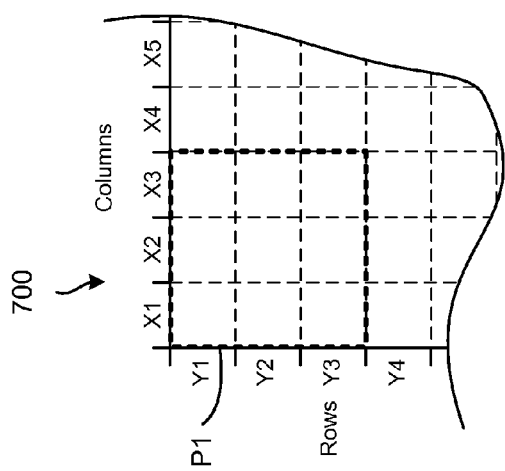

FIGS. 7A through 7C are diagrams that illustrate calculations of hash values of a portion of an image 700 using a rolling hash procedure. The pixels of the image 700 are represented by the grid (shown in dashed lines). Columns of pixels are labeled on the x-axis and rows of pixels are labeled on the y-axis. The hash values can be used for comparison of duplicate portions by, for example, the match encoder 30 shown in FIG. 3 and/or the match encoder 520 shown in FIG. 5.

FIG. 7A illustrates a block of pixels represented by block P1, and FIG. 7B illustrates a block of pixels represented by block P2, which is shifted to the right one column of pixels from the block P1. FIG. 7C illustrates a block of pixels represented by block P3, which is shifted down one row of pixels from the block P1. Each of the blocks P1 through P3 are a 3×3 matrix of pixels. For example, block P1 includes pixels (X1, Y1) through (X3,Y3).

A hash value Q is calculated for each of the blocks P1 through P3 (shown in FIGS. 7A through 7C) based on pixel values associated with each of the pixels included in the respective blocks. In some embodiments, the pixel values for each of the pixels can be, for example, a numeric value, or set of numeric values (e.g., red, green, and blue (RGB) color values), representing an aspect (e.g., a color, a chrominance) of the corresponding pixel. For example, the hash value Q(P1) can be calculated based on pixel values associated with each of the pixels included in the block P1. For example, the hash value Q(P1) can be calculated based on the following general formula:

$$Q(Block) = [\text{Hash of First Column of Pixel Values}]*k + [\text{Hash of Second Column of Pixel Values}]*k^2 + [\text{Hash of Third Column of Pixel Values}]*k^3.$$

The constant k can be, for example, a prime number, or another constant value. Substituting the pixel values for block P1 into the formula, where the pixel values are represented by the coordinates of each pixel, yields:

$$Q(P1) = [Q(\text{Column } X1, \text{Row } Y1{:}Y3)]*k + [Q(\text{Column } X2, \text{Row } Y1{:}Y3)]*k^2 + [Q(\text{Column } X3, \text{Row } Y1{:}Y3)]*k^3$$

where

Q(Column X1, Row Y1:Y3)=(X1,Y1)*k+(X1,Y2)*k$^2$+(X1,Y3)*k$^3$

Q(Column X2, Row Y1:Y3)=(X2,Y1)*k+(X2,Y2)*k$^2$+(X2,Y3)*k$^3$

Q(Column X3, Row Y1:Y3)=(X3,Y1)*k+(X3,Y2)*k$^2$+(X3,Y3)*k$^3$.

After the hash value Q(P1) for block P1 has been calculated, the hash values for block P2 (shown in FIG. 7B) and block P3 (shown in FIG. 7C) can be derived from the hash value Q(P1) calculated for block P1. For example, the mathematical manipulation to derive the hash value Q(P2) from the hash value Q(P1) can be handled using a variety of operations. Specifically, the hash value Q(P2) can be calculated by first dividing the hash value Q(P1) by the constant k, subtracting the hash of the first column of pixel values from block P1 (represented as Q(Column X1, Row Y1:Y3)), and then adding the hash of the third column of pixel values from the block P2 (represented as Q(Column X4, Row Y1:Y3)) multiplied by k$^3$. Only the hash of the third column of pixel values from block P2 need to be added to calculate the hash value Q(P2) because the first column and second column of pixel values from the block P2 correspond with the second column and third column of pixel values from the block P1, respectively. The formula for the hash value Q(P2) is shown below:

$$Q(P2) = [Q(\text{Column } X2, \text{Row } Y1{:}Y3)]*k + [Q(\text{Column } X3, \text{Row } Y1{:}Y3)]*k^2 + [Q(\text{Column } X4, \text{Row } Y1{:}Y3)]*k^3$$

where

Q(Column X4, Row Y1:Y3)=(X4,Y1)*k+(X4,Y2)*k$^2$+(X4,Y3)*k$^3$.

Similarly, the hash value Q(P3) for block P3 (shown in FIG. 7C) can be derived from the hash value Q(P1) calculated for block P1. Specifically, the pixel values associated with row Y1 of block P1 in the hash value for Q(P1) can be calculated based on a hash of the pixel values associated with rows Y2 through Y4 of block P3 to calculate the hash value Q(P3) for block P3. The mathematical manipulation to derive the hash value Q(P3) from the hash value Q(P1) can be handled using a variety of operations. For example, Q(Column X1, Row Y2:Y4) (shown below) can be derived from Q(Column X1, Row Y1:Y3) (shown above). The constants k, k$^2$, and k$^3$ multiplied (from left to right) by the pixel values of the row Y1 can be subtracted from hash value Q(P1) and the constants k, k$^2$, and k$^3$ multiplied (from left to right) by the pixel values of the row Y4 can be added to hash value Q(P1) to arrive at the hash value Q(P3). The formula for the hash value Q(P3) is shown below:

$$Q(P3) = [Q(\text{Column } X1, \text{Row } Y2{:}Y4)]*k + [Q(\text{Column } X2, \text{Row } Y2{:}Y4)]*k^2 + [Q(\text{Column } X3, \text{Row } Y2{:}Y4)]*k^3$$

where

Q(Column X1, Row Y2:Y4)=(X1,Y2)*k+(X1,Y3)*k$^2$+(X1,Y4)*k$^3$

Q(Column X2, Row Y2:Y4)=(X2,Y2)*k+(X2,Y3)*k$^2$+(X2,Y4)*k$^3$

Q(Column X3, Row Y2:Y4)=(X3,Y2)*k+(X3,Y3)*k$^2$+(X3,Y4)*k$^3$.

Although not shown, a hash value Q(P4) for a block shifted to the right (one column of pixels) and down (one row of pixels) from block P1 can be similarly derived from the hash value Q(P2) for block P2 (shown in FIG. 7B) and the hash value Q(P3) for block P2 (shown in FIG. 7C). The formula for the hash value Q(P4) is shown below:

$$Q(P4) = [Q(\text{Column } X2, \text{Row } Y2{:}Y4)]*k + [Q(\text{Column } X3, \text{Row } Y2{:}Y4)]*k^2 + [Q(\text{Column } X4, \text{Row } Y2{:}Y4)]*k^3$$

where

Q(Column X2, Row Y2:Y4)=(X2,Y2)*k+(X2,Y3)*k$^2$+(X2,Y4)*k$^3$

Q(Column X3, Row Y2:Y4)=(X3,Y2)*k+(X3,Y3)*k$^2$+(X3,Y4)*k$^3$

Q(Column X4, Row Y2:Y4)=(X4,Y2)*k+(X4,Y3)*k$^2$+(X4,Y4)*k$^3$.

By deriving hash values from other hash values, the calculations of the hash values can be simplified, and performed at a relatively rapid rate. Additional rows and/or columns can be added to and/or subtracted from a previously calculated hash value to calculate a new hash value for a block without manipulating (e.g., adding, using) all of the pixel values for each of the pixels included within the block. This can be a particular advantage for relatively large blocks that can include hundreds of pixels. In some embodiments, hash values can be calculated for blocks of pixels without deriving the hash values from other previously calculated hash values. For example, hash value Q(P3) can be calculated based on pixel values (e.g., a block of pixel values) without deriving the hash value Q(P3) from hash value Q(P1).

In some embodiments, hash values can be calculated for blocks that are shifted from one another by one or more rows of pixels and/or one or more columns of pixels. For example, although not shown, in some embodiments, the block P2 can be shifted more than one column of pixels from the block P1. In such embodiments, the block P2, even though it is shifted more than one column pixels from block P1, can be used to calculate a hash value based on a hash value for block P1. As another example, although not shown, in some embodiments, the block P2 can be shifted by one column of pixels and by one row of pixels from the block P1. In such embodiments, the block P2, even though it is shifted by one column pixels and by one row of pixels from block P1, can be used to calculate a hash value based on a hash value for block P1.

Figure 8:
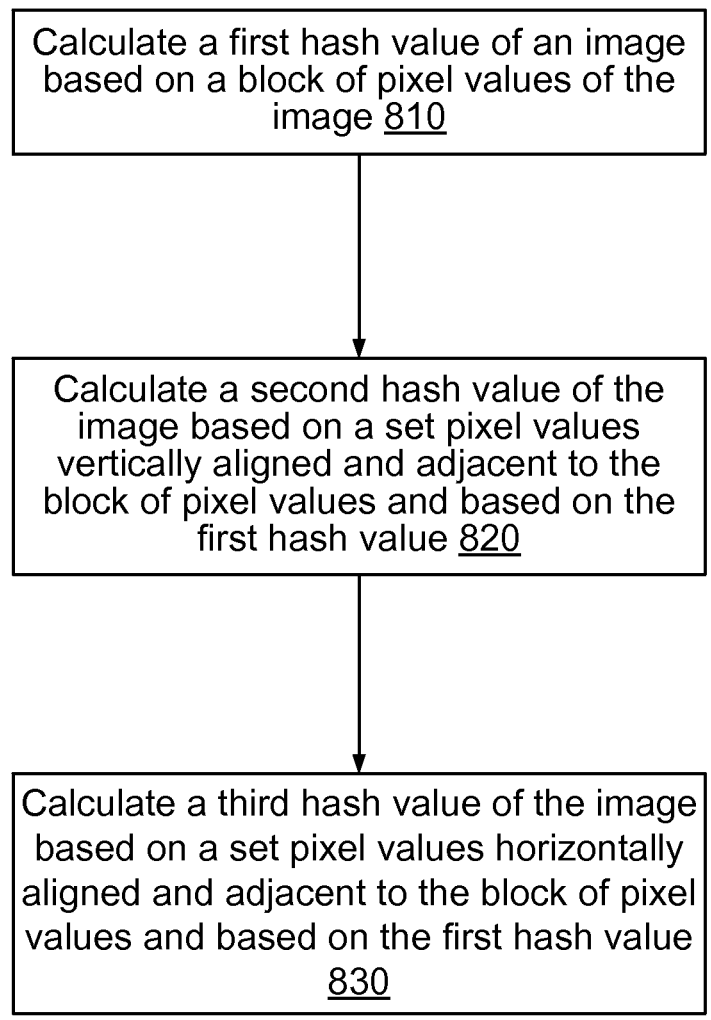
FIG. 8 is a flowchart that illustrates a method for calculating hash values using a rolling hash procedure.

FIG. 8 is a flowchart that illustrates a method for calculating hash values using a rolling hash procedure. As shown in FIG. 8, a first hash value of an image is calculated based on a block of pixel values of the image (block 810), and a second hash value of the image is calculated based on a set pixel values vertically aligned and adjacent to the block of pixel values and based on the first hash value (block 820). In some embodiments, the set of pixel values vertically aligned (which can define a column) can be shifted one column of pixels from the block pixel values. In some embodiments, at least a portion of the first hash value can be subtracted from the first hash value to calculate second hash value.

A third hash value of the image based on a set pixel values horizontally aligned and adjacent to the block of pixel values and based on the first hash value (block 830). In some embodiments, the set of pixel values horizontally aligned (which can define a row) can be shifted one row of pixels from the block pixel values. Thus, the set of pixel values that are horizontally aligned can be orthogonal to the set of pixel values that are vertically aligned. The set of pixel values that are horizontally aligned may not overlap with the set of pixel values that are vertically aligned. In some embodiments, a portion of the first hash value used to calculate the second hash value can be different than a portion of the first hash value used to calculate the third hash value. In some embodiments, the first hash value, the second hash value, and/or the third hash value can be calculated using the hash value calculator 630 shown in FIG. 6A.

Referring back to FIG. 6A, the hash value calculator 630 can also be configured to calculate hash values for a current image C2 and store the hash values of the current image as current image hash values 64. The hash values for the current image C2 can also be based on the block H. Specifically, hash values can be calculated for each combination of pixels for current image C2 that can be included in the area covered by block H using a rolling hash procedure (such as that described above) and/or another type of hash calculation procedure. In some embodiments, hash values for the current image C2 can be calculated using the same hash value calculation procedure and/or scan pattern that is used to calculate the hash values for the prior image C1. In some embodiments, the hash values (e.g., prior image hash value 62, current image hash value 64) calculated for use by the match encoder 620 can be different from or the same as hash values that can be stored as the block values 31 shown in FIG. 3.

As shown in FIG. 6A, the match encoder 620 includes a hash value comparator 640. The hash value comparator 640 is configured to compare the prior image hash values 62 with the current image hash values 64 to determine (e.g., identify) whether or not portions of the prior image C1 are duplicated (albeit shifted in position) within the current image C2. For example, a hash value from the prior image hash values 62 that matches with the hash value from the current image hash values 64, as determined by (and indicated by) the hash value comparator 640, can be an indicator that a set of pixels used to calculate the hash value from the prior image hash values 62 is identical to a set of pixels used to calculate the hash value from the current image hash values 64.

In some embodiments, each hash value from the current image hash values 64 can be compared with each hash value from the prior image hash values 62 to identify matches (e.g., duplications). In some embodiments, once a match has been identified between a hash value from the current image hash values 64 and a hash value from the prior image hash values 62, further comparison of the hash value from the current image hash values 64 with the remaining hash values from the prior image hash values 62 can be terminated. In some embodiments, further comparisons can be performed by comparing pixel values between blocks of pixel values (between a current image and a prior image).

In some embodiments, matches (e.g., duplicates) between the prior image hash values 62 and the current image hash values 64 can be identified (e.g., identified dynamically) as the current image hash values 64 are being calculated. For example, the prior image hash values 62 for each combination of pixels for the prior image C1 that can be included in the area covered by block H (e.g., block window H) can be stored in the memory 670. As hash values are being calculated for the current image C2 using, for example, a rolling hash procedure, the hash values for the current image C2 can be compared with each of the prior image hash values 62 (until a match is identified (e.g., found)) and the hash values for the current image C2 can be stored as current image hash values 64.

Figure 6B:
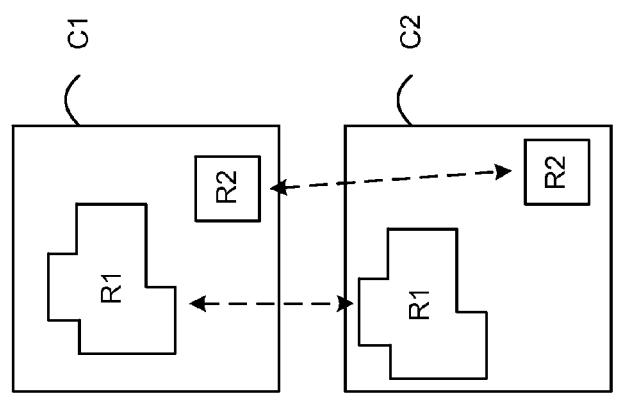
FIG. 6B illustrates two different regions that are duplicated within images.

In some embodiments, multiple hash values from the prior image hash values 62 can match with hash values from the current image hash values 64. For example, FIG. 6B illustrates two different regions, region R1 and region R2, that are duplicated between the prior image C1 and the current image C2. Region R2 is a square region identified based on a match of a single hash value calculated for the prior image C1 and a single hash value calculated for the current image C2. Region R1, in contrast, is a non-square region related to multiple matching hash values between blocks of prior image C1 and blocks of the current image C2.

Referring back to FIG. 6A, block sizes that are used to calculate hash values can vary. In some embodiments, block sizes used calculate hash values can be between two times larger than a single pixel size and many times larger than a single pixel size (e.g., 5 times larger, 50 times larger, 500 times larger). In some embodiments, the use of a relatively large block size can result in a relatively small number of matches between blocks in a prior image and blocks in a current image than if using a smaller block size. However, the use of a relatively small block size can require significant computing resources and/or time to calculate and/or perform comparisons between relatively large numbers of hash values related to the relatively small block sizes.

After comparisons between the prior image hash values 62 and the current image hash values 64 are completed by the hash value comparator 640, the current image hash values 64 can replace the prior image hash values 62. Accordingly, the current image hash values 64 can be considered prior image hash values that can be compared with subsequent hash values calculated for an image subsequent to image C2 (in a pipelined fashion). The current image C2 can be considered a prior image and the image subsequent to image C2 can be considered a current image.

Although not shown in FIG. 6A, in some embodiments, the current image hash values 64 can be compared with hash values associated with more than one prior image and/or non-consecutive prior images. Accordingly, image hash values for blocks associated with images that are not consecutive (e.g., not adjacent in time) within an image stream can be compared. For example, the current image hash values 64 associated with image C2 can be compared with the prior image hash values 62 associated with a prior image C1 and/or with hash values (not shown) associated with an image prior to prior image C1. In such embodiments, movement data associated with a region duplicated within non-adjacent images can refer to movement of the duplicated region between the non-adjacent images.

As shown in FIG. 6A, the match encoder 620 includes an encoder selector 660. The encoder selector 660 can have functionality similar to the functionality of the encoder selector 350 shown in FIG. 3. The encoder selector 660 can be configured to designate non-duplicated (e.g., non-matching) regions for encoding based on one or more encoding procedures (e.g., encoding algorithms) implemented by encoders (not shown) different from the match encoder 620. For example, a region in a current image that is not duplicated (even at a different x-y location) in a prior image can be designated for encoding by encoders (not shown) different from the match encoder 620. The encoding can be, or can include, for example, lossy encoding (e.g., a discrete cosine transform (DCT) based encoding technique), lossless and encoding, variable-length encoding, entropy encoding, and/or so forth. Duplicated regions between a prior image and a current image will not be designated for encoding, but the duplicated region within the current image will instead be characterized with respect to the prior image based on movement data.

In some embodiments, the encoder selector 660 can be configured to change a designation associated with a region. For example, a region in a current image that is not duplicated in a prior image can be initially designated for encoding by encoders (not shown) different from the match encoder 620. If a portion of the region (based on another block comparison) from the current image is later identified as matching another region of the prior image, the designation of the portion of the region can be changed. Specifically, the portion of the region can be designated for duplication, and the remaining portions (if any) of the region can be designated for encoding using an encoder (not shown) different from the match encoder 620.

Although not shown in FIG. 6A, the encoder selection module 610 can include any of the components included in the encoder selection module 310 shown in FIG. 3. For example, the encoder selection module 610 can include a block value calculator (e.g., block value calculator 320), a block comparator (e.g., block comparator 330), a rate calculator (e.g., rate calculator 340), several encoders (including the match encoder 620) (e.g., encoders 360), a memory (e.g., memory 370), and/or so forth. In some embodiments, the functionality associated with or more portions of the match encoder 620 can be incorporated into, and/or combined with, for example, the functionality of the modules shown in FIG. 3. For example, the functionality of the hash value comparator 640 shown in FIG. 6A can be combined with the functionality of the block comparator 330 shown in FIG. 3. Similarly, the functionality of the hash value calculator 630 shown in FIG. 6A can be combined with the functionality of the block value calculator 320 shown in FIG. 3.

Figure 9:
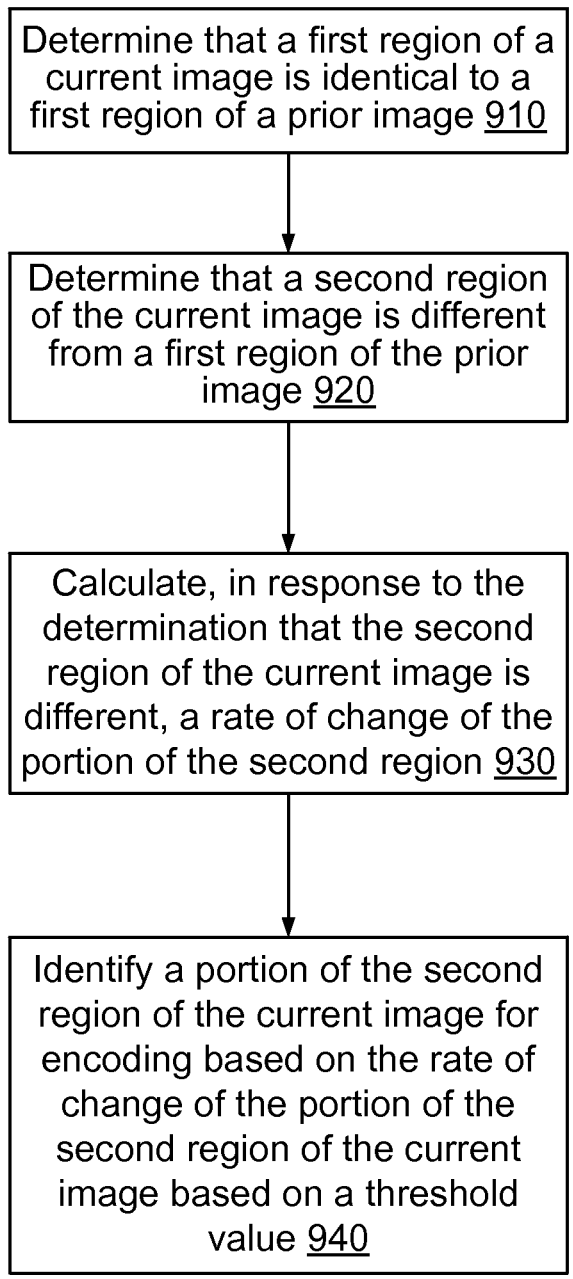
FIG. 9 is flowchart that illustrates a method for designating a region for encoding based on an encoder.

FIG. 9 is flowchart that illustrates a method for designating a region for encoding based on an encoder. At least some portions of the method can be performed by an encoder selection module (e.g., an encoder selection module 110 shown in FIG. 1).

A first region of a current image is determined to be identical to a first region of a prior image (block 910). The first region of the current image, when identical to the first region of the prior image, can be designated as a non-analyzed region (e.g., region 211 shown in FIGS. 2A through 2C). Thus, encoding of the first region may not be performed, and selection of an encoder for encoding of the first region may not be performed by an encoder selection module.

A second region of the current image is determined to be different from a first region of the prior image (block 920). The first region of the current image, when different from the first region of the prior image, can be designated as an analyzed region (e.g., region 212 shown in FIGS. 2A through 2C). Thus, selection of an encoder for encoding of the second region of the current image may be performed by an encoder selection module. In some embodiments, the first region and/or the second region can be a block.

A rate of change of the portion of the second region is calculated in response to the determination that the second region of the current image is different (block 930). In some embodiments, the rate of change of the portion can be calculated by a rate calculator (e.g., rate calculator 340 shown in FIG. 3).

A portion of the second region of the current image is identified for encoding based on the rate of change of the portion of the second region of the current image based on a threshold value (block 940). In some embodiments, the portion of the second region of the current image can be identified for encoding using a match encoder, a DCT encoder, and/or so forth based on the threshold value.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium storing instructions that when executed cause a processor to perform a process, the instructions comprising instructions to:
    receive a block at a block location within an image from a plurality of images, the block location being included in each image from a plurality of images defining at least a portion of a stream of images transmitted from a host device to a client device;
    calculate a rate of change of portions of the plurality of images at the block location being calculated based on more than two images from the plurality of images;
    designate the block of the image for encoding based on a first encoder when a first condition is satisfied based on the rate of change; and
    designate the block of the image for encoding based on a second encoder when a second condition is satisfied based on the rate of change.

2. The computer-readable storage medium of claim 1, wherein the first condition is satisfied when the rate of change is greater than a threshold value, and the second condition is satisfied when the rate of change is less than the threshold value.

3. The computer-readable storage medium of claim 1, wherein the image is a first image, the first encoder is configured to identify portions of the block of the first image that are duplicated within portions of a second image from the plurality of images.

4. The computer-readable storage medium of claim 1, wherein the rate of change is based on a number of blocks at the block location that have changed over a specified number of images from the plurality of images.

5. The computer-readable storage medium of claim 1, wherein the image is a first image from the plurality of images,
    the instructions further comprising instructions to:
        determine that at least a portion of the block of the first image is duplicated within a block of a second image from the plurality of images; and
        calculate an offset of the portion of the block of the first image from the portion of the block of the second image.

6. The computer-readable storage medium of claim 1, wherein the image is a first image from the plurality of images,
    the instructions further comprising instructions to:
        determine that at least a portion of the block of the first image is duplicated within a block of a second image from the plurality of images; and
        increase, in response to the determination, a size of the portion of the block of the first image based on a comparison of bit values outside of the block of the first image with bit values outside of the block from the second image.

7. The computer-readable storage medium of claim 1, wherein the first encoder is configured to perform encoding based on a rolling hash algorithm.

8. The computer-readable storage medium of claim 1, wherein the first encoder is a match encoder, and the second encoder is a discrete cosine transform (DCT) encoder.

9. An apparatus, comprising:
    a rate calculator configured to decrement a rate value associated with a block location in response to a block at the block location in a first image being duplicated in a block at the block location in a second image,
    the rate calculator configured to increment the rate value in response to the block in the second image being different from a block at the block location in a third image, the first image, the second image and the third image defining at least a portion of a stream of images transmitted from a host device to a client device; and
    an encoder selector configured to select, based on the rate value after the decrementing, an encoder for encoding the block of the first image.

10. The apparatus of claim 9, further comprising:
    a block value calculator configured to calculate a block value for the block at the block location in the first image, and a block value for the block at the block location in the second image; and
    a block comparator configured to determine that the block at the block location in the first image is duplicated in the block at the block location in the second image based on the block value of the block at the block location in the first image and the block value for the block at the block location in the second image.

11. The apparatus of claim 9, wherein the encoder is a first encoder selected from a plurality of encoders, the encoder selector configured to select, based on the rate value after the incrementing, a second encoder for encoding the block of the second image, the first encoder being different from the first encoder.

12. The apparatus of claim 9, wherein the encoder is a match encoder configured to identify duplicate regions that have shifted within an x-y plane when the rate value represents a stable block location.

13. The apparatus of claim 9, wherein the rate value represents a rate of change of the block location over a plurality of images including more than five images.

14. The apparatus of claim 9, wherein the block location is a first block location, the block of the first image is a first block of the first image, the rate value is a first rate value, and the encoder is a first encoder, the encoder selector is configured to an encoder selector configured to select, based on a rate value of a second block location associated with a second block of the first image, a second encoder for encoding the second block of the first image.

15. The apparatus of claim 9, wherein the encoder is a discrete cosine transform (DCT) encoder.

16. A non-transitory computer-readable storage medium storing instructions that when executed cause a processor of a host device to perform a process, the instructions comprising instructions to:

determine that a first region of a current image is identical to a first region of a prior image;

determine that a second region of the current image is different from a second region of the prior image;

calculate, in response to the determination that the second region of the current image is different, a rate of change associated with the second region; and identify a portion of the second region of the current image for encoding based on the rate of change associated with the portion of the second region of the current image based on a threshold value.

17. The computer-readable storage medium of claim 16, wherein the current image and the prior image are included in a stream of images, the rate of the change is calculated based on more than two images from the stream of images.

18. The computer-readable storage medium of claim 16, wherein the portion of the second region of the current image is a first portion of the second region of the current image, the encoding includes encoding based on a first encoding procedure, the instructions further comprising instructions to:

identify, based on a rate of change associated with the second portion of the second region of the current image, a second portion of the second region of the current image for encoding based on a second encoding procedure, the rate of change associated with the first portion being different from the rate of change associated with the second portion.

19. The computer-readable storage medium of claim 18, wherein the first encoding procedure is a match encoding procedure, the instructions further comprising instructions to:

identify a third portion of the second region of the current image for encoding based on at least one of a second encoding procedure or the third encoding procedure based on the match encoding procedure.

20. The computer-readable storage medium of claim 16, wherein the current image and the prior image are included in a stream of images, the portion of the second region is associated with a block location, the rate of change is calculated based on a count of changes of blocks from the stream of images at the block location.

21. The computer-readable storage medium of claim 16, wherein a location of the first region of the current image corresponds with a location of the first region of the prior image, and a location of the second region of the current image corresponds with a location of the second region of the prior image, the instructions further comprising instructions to:

determine that the portion of the second region of the current image is duplicated within a portion of the second region of the prior image, the portion of the second region of the prior image has a location that has shifted from a location of the portion of the second region of the current image.

* * * * *